United States Patent
Castel

[11] Patent Number: 5,302,006
[45] Date of Patent: Apr. 12, 1994

[54] BRAKE REGULATOR WITH LEVER AND IMPROVED RESPONSE TIME

[75] Inventor: Philippe Castel, Paris, France

[73] Assignee: Bendix Europe Services Techniques, Drancy, France

[21] Appl. No.: 909,269

[22] Filed: Jul. 6, 1992

[30] Foreign Application Priority Data

Jul. 30, 1991 [FR] France ................. 91 09668

[51] Int. Cl.$^5$ .................... B60T 8/22; B60T 11/34
[52] U.S. Cl. .................... 303/9.69; 137/901; 251/231; 303/22.8
[58] Field of Search .............. 303/9.69, 22.1, 22.7, 303/22.8; 197/901; 251/231, 242, 354

[56] References Cited

U.S. PATENT DOCUMENTS

| | | | |
|---|---|---|---|
| 1,848,767 | 3/1932 | Carter | 137/901 |
| 4,219,242 | 8/1980 | Carre | 303/6 |
| 4,597,610 | 7/1986 | Stumpe | 303/22.8 |
| 4,615,566 | 10/1986 | Perrin | 303/6 |

FOREIGN PATENT DOCUMENTS

| | | | |
|---|---|---|---|
| 0018254 | 10/1980 | European Pat. Off. | 303/22.8 |
| 0079427 | 5/1983 | European Pat. Off. | 303/9.69 |
| 0156666 | 10/1985 | European Pat. Off. | |
| 2948839 | 6/1981 | Fed. Rep. of Germany | 303/9.69 |
| 3707536 | 9/1988 | Fed. Rep. of Germany | |
| 2383048 | 10/1978 | France | |
| 2190174 | 11/1987 | United Kingdom | |

*Primary Examiner*—Matthew C. Graham
*Attorney, Agent, or Firm*—Larry J. Palguta; Ken C. Decker

[57] ABSTRACT

The invention relates to a brake regulator interposable between a hydraulic pressure source and a motor-vehicle brake circuit, of the type comprising a housing equipped with a bore, a simple or differential piston sliding in the bore and delimiting there a first (18) and a second (20) pressure chamber capable of being connected to the pressure source and to the brake circuit respectively, the chambers (18, 20) communicating with one another by means of a passage made in the piston, a valve mounted in the passage and stretched elastically to bear sealingly against a seat formed on the piston, and a return boring interposed between a movable element, the position of which varies as a function of the load of the vehicle, and the piston, so as to stress the latter toward the bottom of the second chamber (20), in a rest position in which the valve is set apart from its seat by a stop (30). The bottom (15) of the second chamber (20) assumes a reentrant shape, the piston (16) comprises a tab (44) projecting opposite the substantially lowest part (13) of the bottom (15), and the stop (30) mounted movably relative to the bottom (15) rests on the bop of a preformed washer (40) forming a lever when the tab (44) bears on it.

4 Claims, 2 Drawing Sheets

BRAKE REGULATOR WITH LEVER AND IMPROVED RESPONSE TIME

BACKGROUND OF THE INVENTION

The present invention relates to an improvement to brake regulators for motor vehicles and more particularly to regulators of the type comprising a housing equipped with a bore, a simple or differential piston sliding in the bore and delimiting there a first and a second pressure chamber capable of being connected to a source of fluid under pressure and to one of the brake circuits of the vehicle respectively, the chambers communicating with one another by means of a passage made in the piston, a valve mounted in the passage and stressed elastically to bear sealingly against a seat formed on the piston, and a return spring interposed between a movable element, the position of which varies as a function of the load of the vehicle, and the piston, so as to stress the latter towards the bottom of the second chamber, in a rest position in which the valve is set apart from its seat by a stop.

Such a brake regulator, more especially designed as a "compensator", is particularly described, and its function and operating mode explained, in FR-A-2,383,048 or EP-A-0,156,666 (Perrin U.S. Pat. No. 4,615,566).

In a regulator of the above-mentioned type, it is desirable, to obtain a correct operation of the brakes when the actuating fluid is put under pressure, to have a relatively wide opening of the valve, that is to say a sufficient setting of this valve (usually consisting of a ball) apart from its seat in the rest position of the piston. Moreover, it is necessary as far as possible to reduce the stroke of the piston between its rest position and its position corresponding to the activation point of the compensator, that is to say that in which the ball comes to rest on its seat, the purpose of this being to avoid disturbing the information transmitted to this piston in the form of a force reflecting the load of the vehicle.

Since these two requirements are incompatible in principle, an object of the present invention is to correct this deficiency, and to achieve this it provides a brake regulator of the above-mentioned type, in which the relative movement of the ball and piston is amplified in relation to that of the piston and body.

SUMMARY OF THE INVENTION

This object is achieved, according to the invention, by mounting the stop movably relative to the bottom of the second chamber, this stop resting on a lever-forming means bearing on the bottom and on one end of the piston in the second chamber. According to one embodiment, the bottom of the second chamber assumes a reentrant shape, and the piston comprises a part projecting opposite the substantially lowest part of the bottom, the stop resting substantially on the center of a preformed washer forming a lever when the projecting part bears on it.

BRIEF DESCRIPTION OF THE DRAWINGS

The invention will now be described by way of example with reference to the accompanying drawings in which.

DESCRIPTION OF THE EMBODIMENTS

Figures 1, 2:
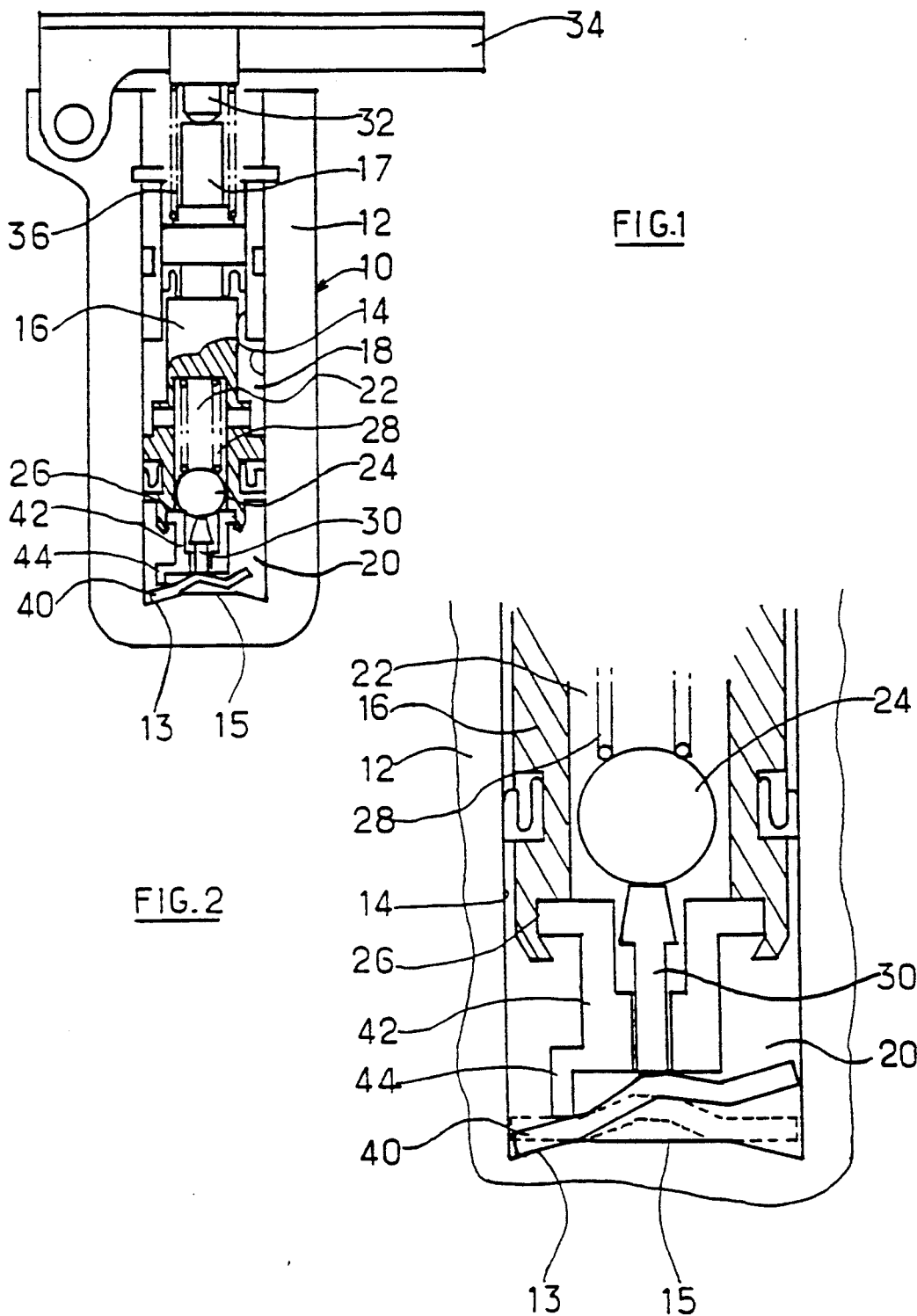
FIG. 1 illustrates a partially sectional elevation view of a brake compensator equipped with the device of the invention and shown in the brake-actuating position.
FIG. 2 shows diagrammatically in section, on a larger scale, the means used in the brake compensator of FIG. 1 at rest.

The brake compensator 10 illustrated in the drawings comprises, in a known way, a housing 12 provided with a stepped bore 14, in which a differential piston 16 is received sealingly slidably. The latter divides the inner cavity of the bore into a first so-called inlet pressure chamber 18, which is adjacent to the face of small cross-section of the piston 16 and which can be connected to a source of fluid under pressure, such as a hydraulic brake master cylinder of the tandem type (not shown), and into a second so-called outlet pressure chamber 20, which is adjacent to the face of large cross-section of the piston 16 and which can be connected to one of the brake circuits of the vehicle, in this particular case the circuit serving the rear-wheel brakes (not shown). The chambers 18 and 20 communicate with one another by means of a passage 22 made in the piston 16, this communication being controlled by a valve consisting of a ball 24 stressed elastically to bear sealingly against a seat 26 fixed to the piston by means of a weak spring 28 compressed in the passage 22. At rest, as will be explained later, the piston 16 is pushed elastically in the direction of the bottom 15 of the bore 14 and the ball 24 is then set apart from its seat 26 by a needle-shaped stop 30 of the housing, thus keeping communication between the chambers 18 and 20 open.

The free end 17 of the piston 16 opposite that carrying the valve seat 26 confronts a pusher 32 fixed to a lever 34 which is mounted pivotably on the housing 12 and the angular position of which is a function of the load supported by the rear axle of the vehicle; the greater this load, the more the lever 34, fixed to the suspension by means of an elastic system (not shown), is lowered, thereby bringing the pusher 32 closer to the free end 17 of the piston 16. Finally, interposed between the pusher and piston is a compression spring 36 which performs the function of a return spring and which, in the absence of any other stress, tends to push the piston 16 towards the bottom 15 of the bore, the force of this spring determining the position of the activation point of the compensator on the braking characteristic of the vehicle, as is well known.

The bottom 15 of the bore assumes a reentrant shape, such as that assumed by the bottom of some bottles. In other words, the periphery 13 of the bottom 15 is lower than the central zone of the bottom 15. A washer 40 having a plane peripheral part and a dome-shaped central zone is arranged on the bottom 15 of the bore, and the needle-shaped stop 30 rests on the top of the dome of this washer. The piston end 42, through which this needle-shaped stop 30 passes, is equipped with a tab 44 projecting opposite the lowest or peripheral part 13 of the bottom.

This tab 44 comes to bear on the peripheral part of the washer 40 at rest. The latter thus tilts and, forming a lever bearing on the bottom 15 of the bore, lifts the needle-shaped stop 30.

At rest, that is to say in the absence of any pressurization of the hydraulic fluid, the piston 16 is pushed towards the bottom 15 of the bore 14 by the return spring 36, as has just been said, the tab 44 tilts the washer 40 which lifts the needle 30, and the ball 24 is then set apart from the valve seat 26 at a distance greater than the length of effective displacement of the piston 16 in relation to the body 12. The pressure prevailing in the chambers 18 and 20 is then the same, that is to say virtually zero, and the brakes of the vehicle are not actuated. When the vehicle driver wishes to apply the brakes, the rise in pressure of the fluid takes place simultaneously in the two chambers, up to the moment when the resultant of the unequal thrusts exerted on the differential piston become sufficient to overcome the force of the return spring 36 and, if appropriate, the elastic force keeping the pivoting lever 34 lowered, thereby causing the piston 16 (and, if appropriate, the lever 34), to be lifted.

Consequently, the tab 44 no longer bears on the washer 40 which resumes a substantially horizontal position on the bottom 15 of the bore, as represented by broken lines in FIG. 2. The needle 30 therefore descends. The movement of the piston continues until the valve seat 26 returns into contact with the ball 24. From this moment, the continuation of the rise in pressure of the fluid contained in the inlet chamber 18 brings about a succession of opening/closing operations of the valve 24, 26, so that the rise in pressure of the fluid contained in the outlet chamber 20 and therefore in the brake circuit of the rear wheels of the vehicle takes place with a reduced increase gradient. When the driver releases the brake pedal, the pressure in the chamber 18 falls again and the differential pressure exerted on the ball 24 changes direction, thus causing the opening of the valve and the equalization of the pressures in the two chambers as well as the return of the piston towards its rest position. The value of the inlet pressure causing the first closing operation of the valve in response to an application of the brakes or of the "activation point" of the compensator marking the deflection of the gradient of the outlet-pressure curve depends, of course, on the constructional characteristics of the piston 16 and on the force of the return spring 36, itself influenced by the position of the pivoting lever 34, that is to say by the load of the vehicle, as is well known to specialists in motor-vehicle braking.

A rapid response of the brakes is thus obtained by having a clear opening of the valve in the rest position, that is to say an appreciable parting between the ball 24 and the seat 26, while at the same time keeping a minimum stroke of the piston 16 compatible with the preservation of the information relating to the load of the vehicle.

Figure 3:
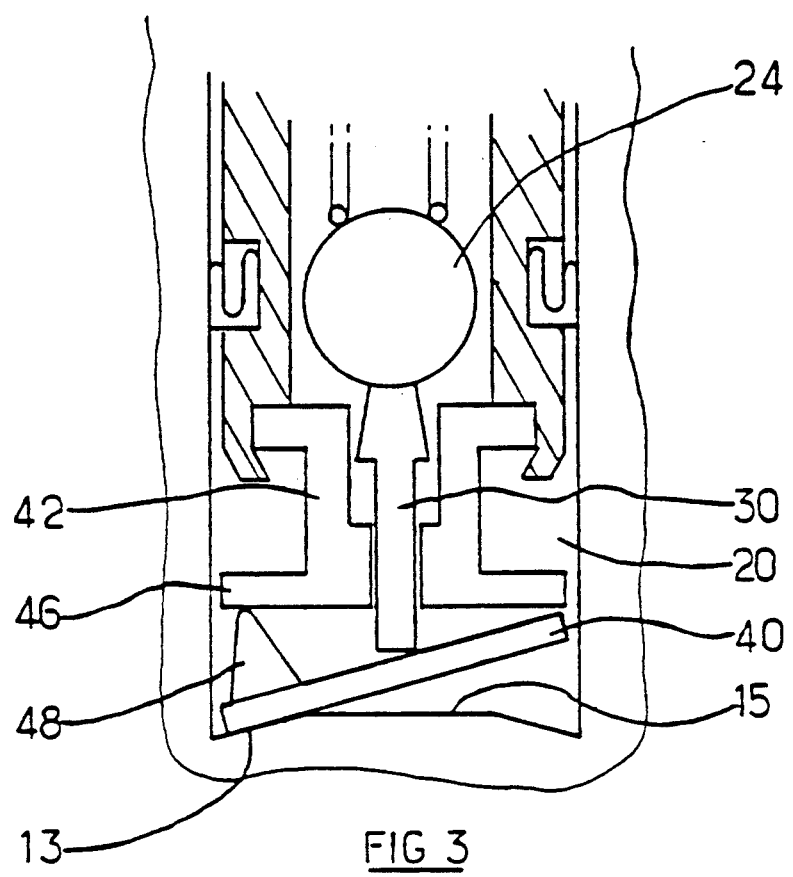
FIGS. 3 and 4 show diagrammatically two other embodiments of a lever-forming means according to the invention.
Figure 4:
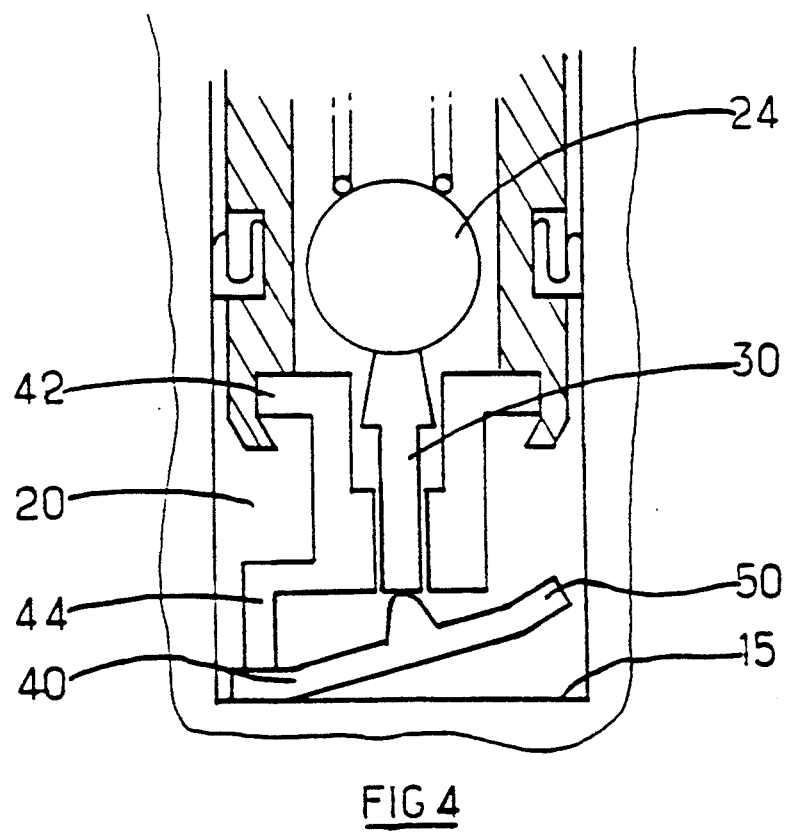

The invention can have many alternative versions, as shown by FIGS. 3 and 4 which illustrate two other embodiments diagrammatically.

In FIG. 3, the bottom 15 of the bore likewise assumes a reentrant shape. The end 42 of the piston has a radially projecting part 46 capable of coming to bear on an arm 48 located on a preformed washer 40 and provided opposite the lowest or peripheral part 13 of the bottom 15.

In FIG. 4, the bottom 15 of the bore is flat, and the washer 40 has a raised peripheral part 50, to form a lever when the tab 44 projecting from the piston comes to bear on it.

Although the invention is described above with regard to its particular use for a brake compensator, it is to be understood that it can similarly be used, affording the same advantages, for a pressure limiter equipped with a simple piston, and because of this its sector of use embraces brake regulators in the broad meaning of the term.

I claim:

1. A brake regulator interposable between a hydraulic pressure source and a motor-vehicle brake circuit, comprising a housing equipped with a bore, a piston sliding in said bore and delimiting first and second pressure chambers capable of being connected respectively to the pressure source and the motor-vehicle brake circuit, said chambers communicating with one another by means of a passage in said piston, a valve in said passage and stressed elastically to bear sealingly against a seat at the piston, and a return spring interposed between a movable element, the position of which varies as a function of loading of the vehicle, and said piston, so as to stress the piston toward a bottom of the second chamber, in a rest position in which said valve is set apart from the seat by a stop, characterized in that said stop is mounted movably relative to the bottom of the second chamber and in opposition to the movement of the piston and rests on lever means which bears on said bottom and on one end of said piston in said second chamber.

2. The brake regulator according to claim 1, characterized in that the bottom of said chamber assumes a reentrant shape, said one end of said piston comprising a part projecting opposite a substantially lower part of said bottom, and said stop resting substantially at the center of the lever means which comprises a performed washer acting as a lever when said part bears on the washer.

3. The brake regulator according to claim 2, characterized in that said washer has a plane peripheral part and a dome-shaped center zone on top of which said stop rests.

4. The brake regulator according to claim 1, characterized in that said stop rests substantially at the center of the lever means which comprises a washer a peripheral part of which is raised to form a lever and on which a part projecting from said one end of the piston may bear.

* * * * *